(12) United States Patent
Öberg

(10) Patent No.: US 9,708,165 B2
(45) Date of Patent: Jul. 18, 2017

(54) WEIGHING SYSTEM FOR LOADS MANIPULATED BY LIFTING EQUIPMENT

(71) Applicant: Komatsu Forest AB, Umeå (SE)

(72) Inventor: Karl Öberg, Vännäs (SE)

(73) Assignee: Komatsu Forest AB, Umeå (SE)

( * ) Notice: Subject to any disclaimer, the term of this patent is extended or adjusted under 35 U.S.C. 154(b) by 134 days.

(21) Appl. No.: 14/646,313

(22) PCT Filed: Nov. 19, 2013

(86) PCT No.: PCT/SE2013/051359
§ 371 (c)(1),
(2) Date: May 20, 2015

(87) PCT Pub. No.: WO2014/081378
PCT Pub. Date: May 30, 2014

(65) Prior Publication Data
US 2015/0323377 A1    Nov. 12, 2015

(30) Foreign Application Priority Data

Nov. 20, 2012  (SE) ........................ 1251308

(51) Int. Cl.
*G01G 3/14*    (2006.01)
*G01G 19/18*   (2006.01)
(Continued)

(52) U.S. Cl.
CPC .............. *B66C 13/16* (2013.01); *B66C 3/005* (2013.01); *B66C 3/04* (2013.01); *E02F 3/3677* (2013.01);
(Continued)

(58) Field of Classification Search
CPC .... G01G 3/1408; G01G 19/18; G01L 5/0009; B66C 3/005; B66C 3/04; B66C 13/16;
(Continued)

(56) References Cited

U.S. PATENT DOCUMENTS 3,695,096 A * 10/1972 Kutsay ................. G01L 1/2225
73/761
3,827,514 A *  8/1974 Bradley .................... B66C 1/40
177/147

(Continued)

FOREIGN PATENT DOCUMENTS

EP    1889808 A1    2/2008
EP    2332877 A1    6/2011
(Continued)

OTHER PUBLICATIONS

International Preliminary Report on Patentability received for PCT Patent Application No. PCT/SE2013/051359, completed on Mar. 4, 2015, 12 pages.

(Continued)

*Primary Examiner* — Randy Gibson
(74) *Attorney, Agent, or Firm* — Morrison & Foerster LLP

(57) ABSTRACT

A system includes: a detection means that detecting the weight of the load that is being manipulated is integrated into a load-sensitive guide pin that forms part of the axle bearing and that can output a signal that is proportional to the effect that is caused by the load, a power source to provide driving power for the load-sensitive guide pin, a sensor cable for the transfer of a driving voltage from the power source to the load-sensitive guide pin, a calculation means that is in signal-transfer connection with the load-sensitive guide pin in order to calculate the weight of the load that corresponds to the signal from the load-sensitive guide pin.

8 Claims, 3 Drawing Sheets

(51) Int. Cl.
*B66C 3/04* (2006.01)
*E02F 3/36* (2006.01)
*E02F 9/26* (2006.01)
*G01L 5/00* (2006.01)
*B66C 13/16* (2006.01)
*B66C 3/00* (2006.01)
*E02F 9/00* (2006.01)

(52) U.S. Cl.
CPC ............ *E02F 3/3681* (2013.01); *E02F 9/006* (2013.01); *E02F 9/264* (2013.01); *G01G 19/18* (2013.01); *G01L 5/0009* (2013.01)

(58) Field of Classification Search
CPC ....... E02F 3/3677; E02F 3/3681; E02F 9/006; E02F 9/264
See application file for complete search history.

(56) References Cited

U.S. PATENT DOCUMENTS

| | | | | |
|---|---|---|---|---|
| 3,853,001 A * | 12/1974 | Mock | ............... | G01G 19/18 212/278 |
| 3,857,452 A * | 12/1974 | Hartman | .............. | G01G 3/1404 177/139 |
| 3,911,737 A | 10/1975 | Ormond | | |
| 5,824,965 A | 10/1998 | Fujii et al. | | |
| 6,298,405 B1 * | 10/2001 | Ito | ......................... | G06F 3/1208 710/107 |
| 6,769,315 B2 * | 8/2004 | Stevenson | .............. | G01G 19/12 73/794 |
| 6,919,516 B2 * | 7/2005 | Frye | ..................... | G01G 3/1408 177/132 |
| 7,311,489 B2 * | 12/2007 | Ekman | .................... | B66C 3/005 294/86.41 |
| 7,378,950 B2 * | 5/2008 | Lehnen | ..................... | B66C 3/04 212/277 |
| 7,514,639 B2 * | 4/2009 | Heuer | ..................... | B66C 13/16 177/147 |
| 2005/0017528 A1 | 1/2005 | Ekman et al. | | |

FOREIGN PATENT DOCUMENTS

| | | |
|---|---|---|
| FI | 896198 A | 6/1991 |
| GB | 2487608 A | 8/2012 |
| JP | 10-227684 A | 8/1998 |
| JP | 2001-089071 A | 4/2001 |
| JP | 2006-112827 A | 4/2006 |
| JP | 2008-096255 A | 4/2008 |
| JP | 2010-159548 A | 7/2010 |
| KR | 10-2011-0045517 A | 5/2011 |
| SE | 527169 C2 | 1/2006 |
| WO | 2004/005180 A1 | 1/2004 |

OTHER PUBLICATIONS

International Written Opinion received for PCT Patent Application No. PCT/SE2013/051359, mailed on Mar. 13, 2014, 7 pages.
International Search Report received for PCT Patent Application No. PCT/SE2013/051359, mailed on Mar. 13, 2014, 5 pages.

* cited by examiner

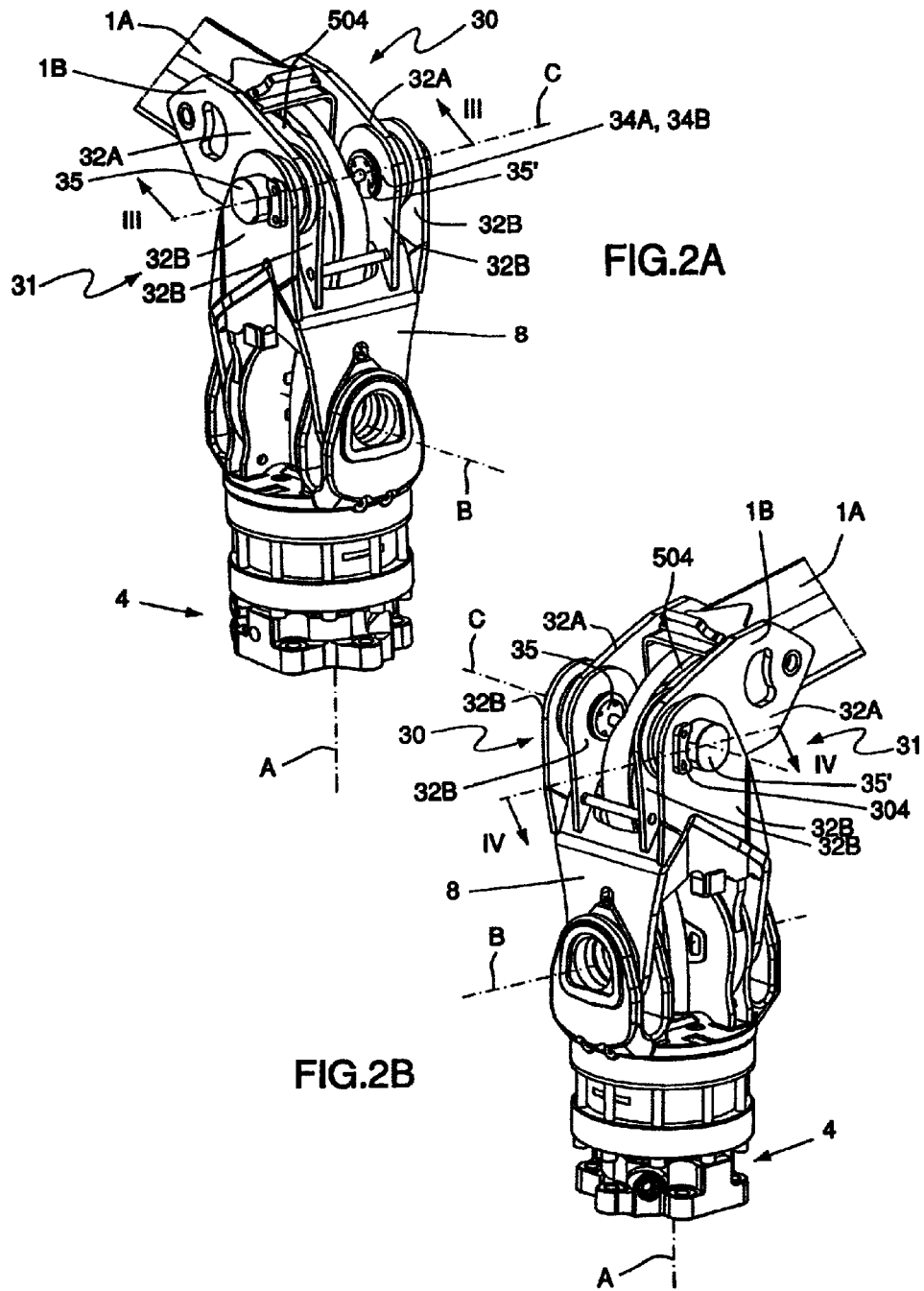

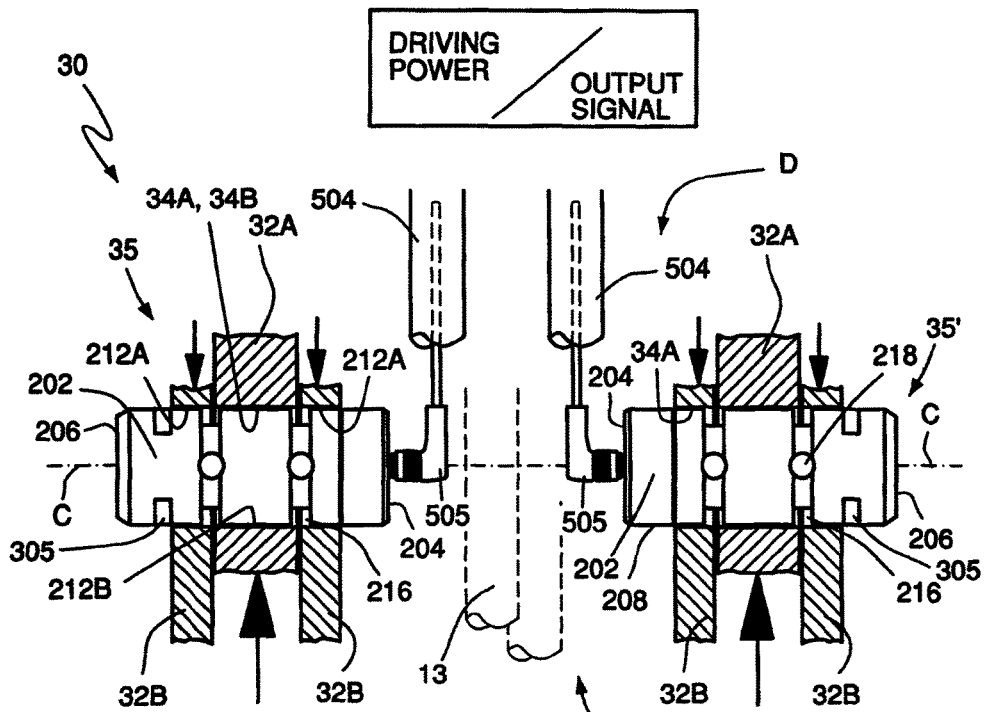
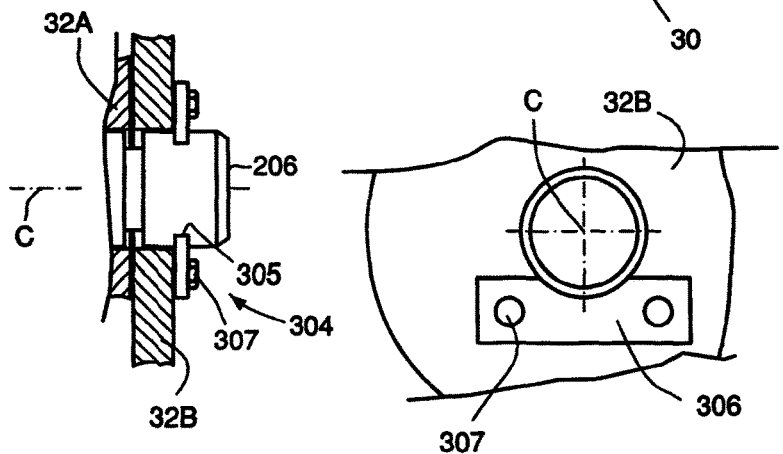

WEIGHING SYSTEM FOR LOADS MANIPULATED BY LIFTING EQUIPMENT

CROSS REFERENCE TO RELATED APPLICATIONS

This application is a U.S. National Stage patent application of PCT/SE2013/051359, filed on Nov. 19, 2013, which claims priority to Swedish Patent Application No. 1251308-1, filed on Nov. 20, 2012, the entire contents of which are incorporated herein by reference.

BACKGROUND OF THE INVENTION

Field of the Invention

The present invention concerns a system for the calculation of the weight of a load that is manipulated with the aid of lifting equipment. The invention concerns also a load-sensitive jointed connector between the end of a crane arm and a cross-piece that is jointed at the same and that allows the load to rotate or to be tilted around an axis of rotation relative to the crane arm.

Description of the Related Art

It is in many cases desirable to obtain knowledge of the weight of a load that is manipulated by lifting equipment such as a crane or similar, and in this way the weight of the total amount of goods manipulated. This type of information is important in order to make it possible to use the full loading capacity of a vehicle while at the same time avoiding overload. It is not possible to obtain the said information if the weight of the goods is not known in advance. It is also necessary in many cases to know how much load a crane arm manipulates during a certain period, not least for statistical purposes, and in order to make it possible to carry out calculations that are necessary for control and follow up. Timber, wood for pulping and wood for energy, are typical examples of products whose weight is difficult to determine without weighing. If load-sensitive arrangements are not available, the risk always arises that loading will take place without the required control, and with the associated risk for overload or for inefficient use of the required loading capacity of a transport vehicle.

Vehicle-mounted cranes that are used during the loading of forestry products are generally provided with a gripper for lifting and manipulating loads of timber. The gripper is suspended at the crane arm through a joint, in a manner that allows pivoting. Rotation of the gripper takes place by means of what is known as a "rotator", whose turning torque is transferred to the crane arm through a jointed connector in the form of a rigid connecting link that normally has a cardan design, in order to allow the gripper that is suspended at the crane arm to pivot in the manner of a wrist joint around two perpendicular principally horizontal axes. Rotation of the gripper around an essentially vertical axis normally takes place by a hydraulic motor. Combination machines are also known in which the gripper is replaced by a harvester head that can be tilted into various operating positions relative to the crane arm. Tree trunks are manipulated where relevant also by a combination of crane arm and timber gripper that have been mounted on a timber lorry.

Lifting equipment of the type specified above with integrated load cells and that can give, in response to an applied load, a signal that corresponds to the force that the applied load exerts on the load cell is previously known. Among these, the following can be mentioned:

U.S. Pat. No. 3,911,737 concerns an arrangement for the weighing of loads that have been lifted by a gripper, such as an individual tree trunk or a bundle of trunks. A load cell is connected in the arrangement between the end of a crane arm that is a component of the arrangement and a rotator, in order to measure the lifting force that arises. The load cell is designed as a suspension scale that extends over the distance between the free end of the crane arm and the load that is to be carried. The extra distance between the crane arm and the load that the suspension scale introduces results in an increased risk of oscillations and it complicates the manipulation of the load. The unprotected design involves a high risk of damage to the load cell from impacts and collisions.

An arrangement is known from SE 527,169 C2 for the calculation of the weight of a load that is manipulated with the aid of lifting equipment that includes a lifting boom intended to support a load through an intermediate link. The intermediate link allows the load to oscillate in a cardan manner around horizontal mutually perpendicular axes. The load cell in this design is integrated in a discrete manner in an end part of the forward end of the lifting boom, whereby the end part is provided on its outer surface with an indentation, in which a load cell and its associated strain gauge are intended to be mounted.

A load-sensitive arrangement is known from FI 84759 C intended to be used at a crane arm provided with a timber gripper. A connection that is located between the end of the crane arm and the timber gripper includes a cross-piece and a rotator. The cross-piece is provided on its outer surface with grooved depressions in which load-sensitive strain gauges are mounted. The strain gauges measure the deformation that arises from the load, and generate a signal that is proportional to the load.

During the manipulation of load, the crane arm is subject to uncontrolled static and dynamic effects of forces. The effects of these loads increase in the direction in towards the jointed attachment point of the crane arm at a base machine that may be constituted by, for example, the wheeled chassis of a forestry machine. The said external forces and effects have a detrimental effect on the measurement results from the load cell, and must be filtered out in order for as correct a measurement result as possible concerning the weight of the load to be obtained. In other words, the further away the load cell is located from the load, the more difficult it will be to calculate the weight of the load accurately. At the same time as the location of the strain gauges of the load cell as close as possible to the load makes it possible to obtain more accurate measurement results, there arises not only the above-mentioned problem of the risk of damage to the load cell due to its exposed position close to the load, but also problems with efficiently and securely supplying the load cell with power and of leading away output signals from the load cell to some type of calculation means or weighing instrument in order to determine the weight of the load. The said calculation means is normally located at a distance away from the load cell, for example on the base machine that supports the crane arm. It should be understood also that in the same way as a load cell that is located relatively close to the load risks being exposed to damage and impacts, also the sensor cable that supplies the measurement cell with power and that leads an output signal from the measurement cell runs a great risk of being damaged, of becoming stuck in an object and becoming crushed during manipulation of the load by means of the crane arm.

SUMMARY OF THE INVENTION

A first purpose of the present invention is, therefore, to achieve a load-sensitive system of the type specified above that does not suffer from these disadvantages, but allows a load cell to be located in close proximity to the load that is intended to be supported at the end of a crane, in order to, as has been mentioned above, make it possible to obtain accurate results from the weighing.

A second purpose of the invention is to achieve a load-sensitive system that makes it possible to place in an efficient, discrete and well protected manner a cable that is intended to supply a load cell with power and where relevant to lead away output signals from the measurement cell to a calculation unit located some distance away. This calculation unit may be in particular, a calculation unit located at a base machine that supports the crane arm.

A third purpose of the invention is to achieve a load-sensitive jointed connector between the end of a crane arm and a cross-piece that is jointed at the same that allows the load to rotate or to be tilted around an axis of rotation relative to the crane arm.

This first purpose of the invention is achieved through an arrangement that has been given the distinctive features and characteristics that are specified in claim 1. The second purpose of the invention is achieved with a jointed connector that demonstrates the distinctive features and characteristics that are specified in claim 10.

The insight that forms the basis of the present invention is to use a load-sensitive guide pin in a shaft coupling between the crane arm and the load. By designing the joint axle line for an axis of rotation C between the crane arm and load as an "open joint" defined by two joints located at a distance from each other along an axis of rotation where each joint comprises an associated guide pin that can at the same time serve as detection means and output a signal that is proportional to the effect that is produced by the load, a number of further advantages are obtained together with a load-sensitive guide pin, namely that a compartment is limited between the two load-sensitive guide pins that can be used to house in a discrete and protected manner a sensor cable for supply of the two load-sensitive pins with power, and possibly also to lead out measurement signals to a calculation unit located distant from the arrangement. It is conceivable in one execution to use only a single load-sensitive guide pin in the axle bearing between the end of the crane arm and the load, which means that the guide pin in question supports only half of the load and that the calculated load, based on a signal from the guide pin, must be doubled in order to obtain a correct measured value for the load. It is conceivable in one execution that a single load-sensitive guide pin is in wireless connection to transfer signals to a calculation unit via, for example, radio transfer or some form of license-free standard such as that according to Wi-Fi®, Zigbee® or Bluetooth®.

BRIEF DESCRIPTION OF THE DRAWINGS

The arrangement according to the invention will be described in more detail below with reference to the attached drawings, of which:

FIGS. 2A and 2B show in a respective perspective view of a jointed connector or cross-piece that is connected such that it can pivot with a nosepiece or end part that is a component of the crane arm such that the load is allowed to oscillate relative to the crane arm;

FIG. 3 shows a cross-section through a shaft coupling viewed along the line III-III in FIG. 2A that according to the invention comprises an axis of rotation C between the crane arm and a jointed cross-piece designed as an open joint defined by two joints separated from each other by a distance along an axis of oscillation where each joint comprises an associated guide pin of the type that can serve at the same time as detection means and to output a signal that is proportional to the effect that is caused by the load;

FIG. 4 shows a partial cross-section of a locking means that is a component of the shaft coupling viewed along the line IV-IV in FIG. 2B and intended for the fixation of an associated guide pin in the jointed connector of the end of the crane arm with a cross-piece, FIG. 5 shows a side view of the locking means in FIG. 4 with partially removed parts.

DETAILED DESCRIPTION OF THE INVENTION

Figure 1:
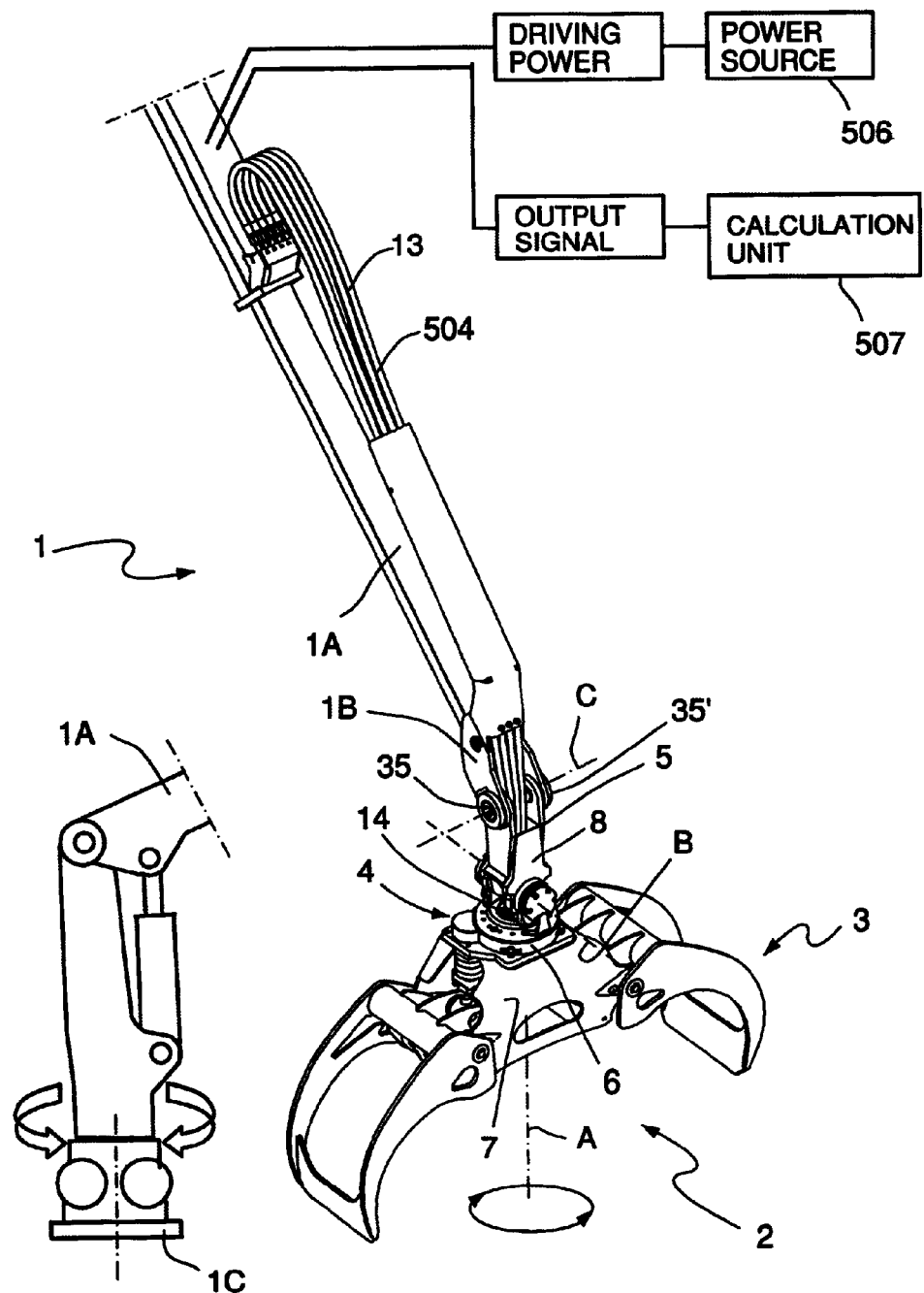
FIG. 1 shows a perspective view of a load-sensitive system according to the invention supported at the free end of a telescopic crane arm of the type that is equipped with a rotator and gripper intended to grip a bundle of timber.

The reference number 1 in FIG. 1 generally denotes a part of lifting equipment that includes a crane arm 1A with an end part 1B and with a tool 2 that can be rotated relative to the crane arm, which tool in this case is constituted by a gripper for gripping trees. It is an advantage that the lifting equipment be mobile and intended to be supported on a crane-support unit 1C that may include, for example, a wheeled chassis that can be driven and that forms part of a forwarder, a harvester, or a timber lorry. The tool 2 is suspended at the free end or end part 1B of the crane arm 1A through a rotator 4 that is united at one of its ends by means of an attachment part 5 with the end part of the crane arm, and is united at its second end through a rotating bearing 6 with a frame 7 in a bearing-supported manner that allows rotation, which frame is a component of the tool. The rotator 4 allows the tool to be rotated around a first axis of rotation A and around its own vertical axis, as is shown by the loop with arrowheads in FIG. 1. There is further included in the crane arm 1A a jointed connector with a cross-piece 8 whereby an attachment part 5 is supported by the crane arm 1 through the said cross-piece in order to allow free rotation of the tool 2 around a second and a third axis of rotation denoted by B and C, respectively. These two axes of rotation are perpendicular not only to each other, but also to the first axis of rotation A. Due to the free suspension, the tool 2 is allowed to rotate in a cardan manner in two different directions relative to the said axis of rotation A and therewith also to rotate relative to the crane arm 1. The supply and withdrawal of hydraulic medium that is required for the operation of the rotator and gripper of the tool takes place through flexible lines 13 that, emerging from the crane arm 1A and extending downwards, are connected at one end to nipples at a swivel connector that is a component of the rotator. The second ends of the lines 13 are connected in a conventional manner to a pump or a tank that forms a part of a hydraulic system at the crane-support unit 1C.

As is made most clear by FIGS. 2A, 2B and FIG. 3, the crane arm 1 and the cross-piece 8 are each equipped with a fork-shaped part 30 and 31, respectively, at the ends where they meet. These two fork-shaped parts 30, 31 that face each other fit one into the other, and each one consists of a pair of fork shanks shaped as bearing lugs, 32A and 32B, that are parallel to the central axis A and located at a distance from each other, which pairs of fork shanks together define a joint in the relevant attachment part 5 mentioned above. The said fork shanks 32A, 32B that fit one inside the other have opposite circular holes or openings 34 for the mounting of bearing bushes (not shown in the drawings) and they are located at such a distance of separation that they define a compartment D between the centre of rotation C of the mutually jointed connected parts. The compartment D has an extent along the said third axis of rotation C. The jointed connection 9 between the fork-shaped parts 30, 31 that fit one inside the other forms a shaft coupling that includes a pair of opposing relatively short guide pins 35, 35' that unite in a jointed manner the respective neighbouring fork shanks 32A, 32B of the fork-shaped parts that meet. The said opposing pins 35, 35' extend through the fork shanks 32A, 32B that meet at each joint without noticeably imposing upon the compartment D that is formed between the fork shanks. Since the joints 30, 31 are separated and located at a distance from each other along the joint axle line of the axis of rotation C, a form of open joint construction is obtained that is both lightweight and strong. It should be understood that the joint axle line for the axis of rotation B, i.e. the joint between the cross-piece 8 and the rotator 4, is designed in a similar way as the one that has been described above for the axis of rotation C. This means that also in this case are the joints separated from each other and located at such a distance from each other along the joint axle line of the axis of rotation B that a compartment is defined between them.

As is made most clear by FIGS. 2A and 2B, the cross-piece 8 is designed as a hollow beam or box that principally demonstrates a square cross-sectional form with a channel or inner cavity with a corresponding square cross-section that runs axially along it. As is made clear by the drawings, the guide grooves 13, whose task is to supply the tool 2 with hydraulic driving medium and that emerge from the crane arm, extend down through the compartment D between the open joint connector and onwards to the swivel connector 14, through the inner cavity of the cross-piece 8.

According to the principles of this invention, the open joint connector that is defined by the axis of rotation C between the crane arm and the cross-piece 8 comprises of a pair of guide pins 35, 35' that are of the type that is equipped with a strain gauge in order to be able at the same time to serve as load-sensitive means and to output a signal that is proportional to the effect that is caused by the load. This type of load-sensitive pin is commercially available and marketed by a number of different manufacturers such as, for example, the Tecsis GmbH company with the product "Load pin F5308". Load-sensitive pins 35, 35' of this type are equipped with one or several strain gauges and are designed to replace directly conventional guide pins in rotating bearings. Strain gauges that are configured to measure the load that appears in the pin are component of the pins 35, 35', and they produce a signal that is proportional to the current load.

With reference to FIG. 3, each load-sensitive pin 35, 35' that is present in the axle bearing between the said meeting fork-shaped parts 30 and 31 comprises a circularly symmetrical body 202 with a first end surface 204 and a second end surface 206, together with an outer surface 208. The outer surface 208 demonstrates parts along its length that define load surfaces 212A, 212B and a number of release surfaces that have a smaller diameter located between the said load surfaces. A number of groove-shaped indentations 216 are formed in the body 202, through which sensor pockets 218 strain gauges extend. If FIG. 3 is studied in more detail, it should be realised that the load surfaces 212A, 212B of each guide pin 35, 35' are used as bearing surfaces for the holes 34A of the meeting fork-shaped parts 30, 31. Glide bearing bushes 34B are mounted in the said holes. Sensor cables 504, which have a protective cover of rubber material as the hydraulic lines have, are used to supply power and to lead out measurement signals (output signals) from the said guide pins 35, 35'. The sensor cables 504 extend from a connection 505 at the first end 204 of the body 202. Due to the fact that the connections 504 are facing in towards the "open joint" of the axis of rotation C, i.e. in towards the compartment D that is limited by the two fork-shaped part 30, 31 of the rotation bearing, a design is obtained that not only offers an elegant and protected route for the cables 504 to and from the load cells in the guide pins 35, 35', but also makes it possible to place the load cells in an "invisible" manner very close to the load that is to be weighed. A sensor cable 504 extends in the compartment D between the centre of rotation C of the mutually jointed parts, which sensor cable is intended to supply a load cell with drive power from a power source 206 located at the crane-support unit 1C, and with which sensor cable output signals can be led from the measurement cell to a well protected calculation unit 507 located on the crane-support unit and is exposed only to minimal tensile and rotatory loads even in the case in which the tool 2 has been maneuvered to its most critical outermost positions. Thus, the load-sensitive guide pins 35, 35' are supplied with power or feed voltage directly from the crane-support unit 1C through a line that extends along the crane arm 1. It is an advantage if each sensor cable 504 is placed in a protected manner inside a cavity or channel in the crane arm 1A. As is made clear by the drawings, also the flexible hydraulic lines 13 that are used for the supply and withdrawal of hydraulic medium to the rotator 4 and the gripper 2 together with the cable 504 of the load-sensitive guide pins 35, 35' extend through the compartment D that is obtained as a consequence of the "open joint". In principle, not only the sensor cables 504 but also the hydraulic lines 13 run parallel with each other from the crane-support unit 1C along the crane arm 1A, the end part 1B and onwards down towards the jointed connection 9 and the swivel connection 14, respectively.

FIG. 4 shows a cross-sectional view of a locking means 304 that is a component of the shaft coupling viewed along the line IV-IV in FIG. 2B. The locking means 304 is intended for the fixation of the said load-sensitive guide pins 35, 35' at their respective joints. The locking means 304 is located at the end 206 of the load-sensitive guide pin 35, 35' that faces away from the centrally limited compartment D of the "open joint", and therefore at the outer surface of the box-shaped central link 8. The locking means 304 comprises a groove-shaped indentation 305 in the second end 206 of the body 202, which indentation is placed perpendicular to the longitudinal axis of the body. The guide pins 35, 35' are locked in place through interaction with a plate-shaped locking means 306 that fits into the indentation and is fixed in place with the aid of screws 307 in close proximity to the holes of the outermost fork shank 32B, for the axle bearing. Due to the location of the locking means on the outer surface of the rotation bearing, the locking means is easy to access for service and maintenance, during, for example, disassembly of the rotation joint for exchange of the glide bearing bushes. In addition to the detection sensor described above that can, in the form of load-sensitive guide pins 35, 35', output a signal that is proportional to the effect that is caused by the load, the arrangement includes also calculation means 507 in the form of a computer or similar located at the crane-support unit 1C in order to calculate the weight of the load that corresponds to the said signal. Depending on the location of the load cell or the load-sensitive guide pins 35, 35', in this case in the rotation bearing between the end part of the crane arm 1 and the cross-piece 8, the total weight recorded will include in addition to the weight of the load itself also a tare weight, that consists of the deadweights of the cross-piece 8, the gripper 2 and the rotator 4. This tare weight is subtracted from the total weight that has been recorded during the calculation of the load weight in the computer. The measured value that is obtained in this way thus forms the weight of the load supported by the crane arm. With the aid of this correction for tare weight, the deadweight of, for example, the gripper 2, and other weights that affect the measurement result can be removed. It is appropriate that the calculation be carried out directly through the regulatory system that is a component of a work machine, of for example a forwarder for the handling of timber, and to which system the output signals from the measurement arrangement are connected. If the load-sensitive guide pins 35, 35' are located in the lower axis of rotation B, i.e. in the bearing between the lower end of the cross-piece 8 and the rotator 4, all that is needed, essentially, is that the deadweights of the timber gripper 2 and the rotator 4 be removed by correction for tare weight. It should be understood that the sensor cables 504 in this execution extend down through an "open joint" in the axis of rotation C, through the inner cavity of the cross-piece and onwards to an "open joint" formed by joints that are located at a distance from each other and formed between the rotator 14 and the lower part of the cross-piece 8. In this execution, the guide pins 35, 35' that are used in the said joints are, naturally, of the load-sensitive type that has been described above. One advantage of the latter execution is, naturally, that the load-sensitive means in the form of the guide pins 35, 35' is located even closer to the load.

The invention is not limited to that which has been described above and shown in the drawings: it can be changed and modified in several different ways within the scope of the innovative concept defined by the attached patent claims.

The invention claimed is:

1. A system for the calculation of a weight of a load that is manipulated with aid of lifting equipment which includes a crane arm that comprises a first end, with which the crane arm is to be mounted such that it can rotate on a crane-support unit, and a second end with an end part attached to it, which, through a jointed connector that includes an axle bearing, allows the load to rotate freely around a defined axis of rotation relative to the crane arm, the system includes:
 a detector detecting the weight of the load that is being manipulated by the crane arm and integrated into a load-sensitive guide pin that forms part of the axle bearing that is a component of the jointed connector and which guide pin can output a signal that is proportional to an effect that is caused by the load,
 a power source to provide driving power for the load-sensitive guide pin,
 a sensor cable for transfer of a driving voltage from the power source to the load-sensitive guide pin in order to drive the same,
 a calculation unit that is in signal-transfer connection with the load-sensitive guide pin and that is arranged to calculate the weight of the load that corresponds to the signal from the load-sensitive guide pin,
wherein the jointed connector comprises:
 a connecting link provided with shanks which, comprised of meeting fork shanks that fit one inside the other, form a free suspension by which the load can swing in a cardan manner around two mutually perpendicular axes relative the crane arm, and
the system further comprising
 a rotator which allows the load to be rotated around a first axis of rotation, which is its own vertical axis,
 a cross-piece which allow free rotation of the load around a second and a third axis of rotation, respectively, said second and third axes of rotation being perpendicular to each other and to the first axis of rotation, wherein, due to a free suspension, the load is allowed to rotate in a cardan manner in two different directions relative to the said first axis of rotation and also to rotate relative to the crane arm,
 an open joint, the axle bearing of which is defined by two joints that are located at a distance from each other along a joint axle line of the axis of rotation and each connect corresponding shanks, a compartment being defined by the two joints, wherein each joint comprises a guide pin, of which at least one guide pin in the axle bearing is of load-sensitive type, and the sensor cable extends in the compartment, and the load-sensitive guide pin is part of the axle bearing so as to be accommodated in the shanks.

2. The system according to claim 1, whereby the power source is supported at the crane-support unit and that the sensor cable is arranged to extend along the crane arm from the crane-support unit to the load-sensitive guide pin in order to supply power to the same.

3. The system according to claim 1, whereby the sensor cable has the tasks both of providing the load-sensitive guide pin with driving voltage from a power source located at a distance and of leading an output signal to the calculation unit for calculation of the weight of the load.

4. The system according to claim 1, comprising a number of guide pins which are pairwise acting in the axle bearing and each of which is of load-sensitive type.

5. The system according to claim 1, whereby each load-sensitive measurement pin has a connector to which it is intended that a sensor cable be connected, and which connector is located, or facing in towards the compartment that is limited between the two joints of the axle bearing in the "open joint".

6. The system according to claim 1, whereby the sensor cable demonstrates a protective outer cover of a rubber material that resists wear.

7. The system according to claim 1, whereby each guide pin demonstrates load-sensitive load surfaces that are used as bearing surfaces for glide bearings bushes that are mounted in circular openings or holes in the meeting fork-shaped parts of the axle bearing.

8. A load-sensitive jointed connector between a crane arm point and a cross-piece connected to it in a jointed manner that allows a load to be rotated or tilted freely relative to the crane arm around an axis of rotation, comprising a detector detecting a weight of the load that is being manipulated by the crane arm and integrated into a load-sensitive guide pin that forms part of an axle bearing that is a component of the jointed connector and which guide pin can output a signal that is proportional to an effect that is caused by the load, wherein the jointed connector between the crane arm and the load is designed as a connecting link provided with shanks which, comprised of meeting fork shanks that fit one inside the other, form a free suspension by which the load can swing in a cardan manner around two mutually perpendicular axes relative the crane arm, wherein each of the load sensitive guide pins comprises a circularly symmetrical body with a first end surface, a second end surface and an outer surface, and has connections for sensor cables having a protective cover of rubber material and supplying a load cell of the detector with drive power from a power source located at a crane-support unit, the connections facing an open joint, the axle bearing of which is defined by two joints that are located at a distance from each other along a joint axle line of the axis of rotation and each connect corresponding shanks, and the load-sensitive guide pin is part of the axle bearing so as to be accommodated in the shanks.

* * * * *